(12) United States Patent
Fong et al.

(10) Patent No.: US 8,224,497 B2
(45) Date of Patent: Jul. 17, 2012

(54) ENERGY LIMIT IN A SLIDING WINDOW IN POWER AND HEAT MANAGEMENT

(75) Inventors: Liana L. Fong, Yorktown Heights, NY (US); Jeffrey Owen Kephart, Ridgefield, CT (US); Yanbin Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/545,711

(22) Filed: Aug. 21, 2009

(65) Prior Publication Data
US 2011/0046804 A1    Feb. 24, 2011

(51) Int. Cl.
*G06F 1/28* (2006.01)
(52) U.S. Cl. ......... 700/296; 700/295; 700/299; 713/320
(58) Field of Classification Search ................ 700/22, 700/28, 275, 276, 286, 291, 292, 295, 296, 700/297, 298, 299, 300; 705/412; 713/300, 713/320, 324, 340
See application file for complete search history.

(56) References Cited

U.S. PATENT DOCUMENTS

| | | | | |
|---|---|---|---|---|
| 4,463,432 A * | 7/1984 | Carter, II | .......... | 700/291 |
| 4,620,283 A * | 10/1986 | Butt et al. | .......... | 700/295 |
| 5,560,022 A | 9/1996 | Dunstan | | |
| 6,021,401 A * | 2/2000 | Oravetz et al. | .......... | 705/412 |
| 6,067,482 A * | 5/2000 | Shapiro | .......... | 700/286 |
| 6,453,198 B1 | 9/2002 | Torgerson | | |
| 6,813,719 B2 * | 11/2004 | Athas | .......... | 713/320 |
| 6,885,115 B2 * | 4/2005 | Hatori et al. | .......... | 307/80 |
| 7,155,912 B2 * | 1/2007 | Enis et al. | .......... | 60/652 |
| 7,209,838 B1 * | 4/2007 | Wright et al. | .......... | 702/60 |
| 7,373,222 B1 * | 5/2008 | Wright et al. | .......... | 700/295 |
| 7,444,526 B2 * | 10/2008 | Felter et al. | .......... | 713/300 |
| 7,640,760 B2 * | 1/2010 | Bash et al. | .......... | 62/178 |
| 7,715,950 B2 * | 5/2010 | Lasseter et al. | .......... | 700/287 |
| 7,783,903 B2 * | 8/2010 | Piazza | .......... | 713/300 |
| 7,840,821 B2 * | 11/2010 | Krishnan et al. | .......... | 713/300 |
| 7,920,942 B2 * | 4/2011 | Lasseter et al. | .......... | 700/286 |
| 2003/0061523 A1 * | 3/2003 | Stanley | .......... | 713/300 |
| 2003/0084358 A1 * | 5/2003 | Bresniker et al. | .......... | 713/324 |
| 2003/0097603 A1 * | 5/2003 | Athas | .......... | 713/500 |
| 2007/0050650 A1 * | 3/2007 | Conroy et al. | .......... | 713/300 |
| 2008/0288123 A1 * | 11/2008 | Krishnan et al. | .......... | 700/295 |
| 2008/0307240 A1 * | 12/2008 | Dahan et al. | .......... | 713/320 |
| 2009/0044027 A1 * | 2/2009 | Piazza | .......... | 713/300 |
| 2009/0119523 A1 * | 5/2009 | Totten | .......... | 713/322 |
| 2010/0037078 A1 * | 2/2010 | Gross et al. | .......... | 713/340 |
| 2010/0315223 A1 * | 12/2010 | Gross et al. | .......... | 340/500 |
| 2010/0318828 A1 * | 12/2010 | Elting et al. | .......... | 713/340 |

OTHER PUBLICATIONS

Dejan Markovic, et al., "Methods for True Energy-Performance Optimization," IEEE Journal of Solid-State Circuits, vol. 39, No. 8, Aug. 2004.
Michael Huang, et al., "A Framework for Dynamic Energy Efficiency and Temperature Management," IEEE, 2000.
Frank Bellosa, et al., "Event-Driven Energy Accounting for Dynamic Thermal Management," Gerrmany.

* cited by examiner

*Primary Examiner* — Charles Kasenge
(74) *Attorney, Agent, or Firm* — Michael J. Buchenhorner

(57) ABSTRACT

A system and method for specifying a temporal window of a fixed size that slides along time; specifying energy consumption as the accumulated power consumption in a temporal window; and applying a threshold that limits the energy consumption in a sliding window, while the power consumption can fluctuate within the window. Power-aware systems apply energy limit as a constraint in performance optimization.

16 Claims, 5 Drawing Sheets

US 8,224,497 B2

ENERGY LIMIT IN A SLIDING WINDOW IN POWER AND HEAT MANAGEMENT

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of power and heat management, and more particularly relates to the field of using an energy limit in a sliding window for power and heat management of computing systems while executing various workloads.

BACKGROUND OF THE INVENTION

Recent technologies are rapidly increasing the power density at all levels. At the computer chip level, for example, there are multi-core chips from major processor manufacturers. At the rack level, blade servers are dominating the market. In data centers, usage of the above technologies rapidly increases the power density of data centers.

Since power consumption is defined as the instantaneous rate at which energy is consumed, using a computing system (or device) of higher power density leads to higher energy consumption. Higher energy leads to higher heat generated by the computing systems and thus leads to higher temperatures to be endured by the systems. High temperature is problematic for computing systems because higher temperature leads to shorter MTBF (mean time between failures) and thus makes systems unreliable. To maintain the appropriate temperature would require stronger cooling systems, which in turn also require higher power consumption.

Thus, power and heat management are critical concerns for large computing systems. Through power and heat management, one goal is to control power consumption to avoid high temperature.

There are multiple technologies to decrease the power consumption of a computing system and thus decrease the generated heat. One such technology is known as clock throttling, where processors are switched to standby modes or deep sleep modes that consume less power. Another technology is Dynamic Voltage and Frequency Scaling (DVFS or DVS). By lowering voltage and frequency (processing speed) together, power consumption is decreased more effectively than other technologies that change frequency only. The current technologies that decrease power consumption cannot avoid decreasing frequency, which will lower the performance.

The current solutions to avoid high temperature in power and heat management fall into two categories: reactive methods and proactive methods. For reactive methods, heat sensors are installed for computing systems and signals are emitted when the temperature is higher than a threshold. Such signals may trigger a power reduction that leads to a reduction of the system's performance. For proactive methods, a power limit, which in general is less than the peak (full capacity) power, is applied such that power consumption at any time is held below the limit.

The drawback of the first method is that the power reduction, which causes a reduction in processing speed, often occurs when the processors are very busy (heavily loaded). Thus, a power cut will inevitably degrade the performance of the workload when the workload demand is high. This is like closing lanes of a highway at rush hour. The drawback of the power limit method is that the method can be too conservative, and will not use the full capacity of a computing system all the time. When the workload is bursty, a workload characteristic exhibited by many web sites and applications, power limit approach degrades the performance during a burst even when the workload is light before and after the burst. Instead of limiting the power consumption all the time, it is natural to think that we can use low power consumption when the workload is light and use high power consumption during the burst to improve the performance of the whole system while we still limit the sum of the power consumption during any period of time.

SUMMARY OF THE INVENTION

Briefly, according to an embodiment of the invention, we describe a method for specifying a temporal window of a certain size that slides along time, specifying energy consumption as the accumulated power consumption in a temporal window, and applying a threshold that limits the energy consumption in a sliding window, while the power consumption is able to fluctuate within the window.

According to another embodiment of the present invention, we discuss an electronic device or system that includes: a device that includes: a) an energy limit algorithm that receives as input an energy limit and a power consumption history of the last sliding window ended at the current time and returns power management decisions that can have a plurality of optimization goals with the energy limit as a constraint; and b) a power consumption history that provides the power consumption history of the last sliding window.

The electronic system further includes a process that includes: a) a parameter setter that receives user input and sets energy limit parameters; b) a power controller that adjusts the power level of the processor and/or other hardware; and c) a decision maker that receives an energy limit from the parameter setter, invokes a process from the energy limit algorithm to get power management decisions, and adjusts the power level of the hardware through power controller based on the decisions.

The method can be either implemented as machine executable instructions executed by a programmable information processing system or as hard coded logic in a specialized computing apparatus such as an application-specific integrated circuit (ASIC) or field programming gate array (FPGA).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
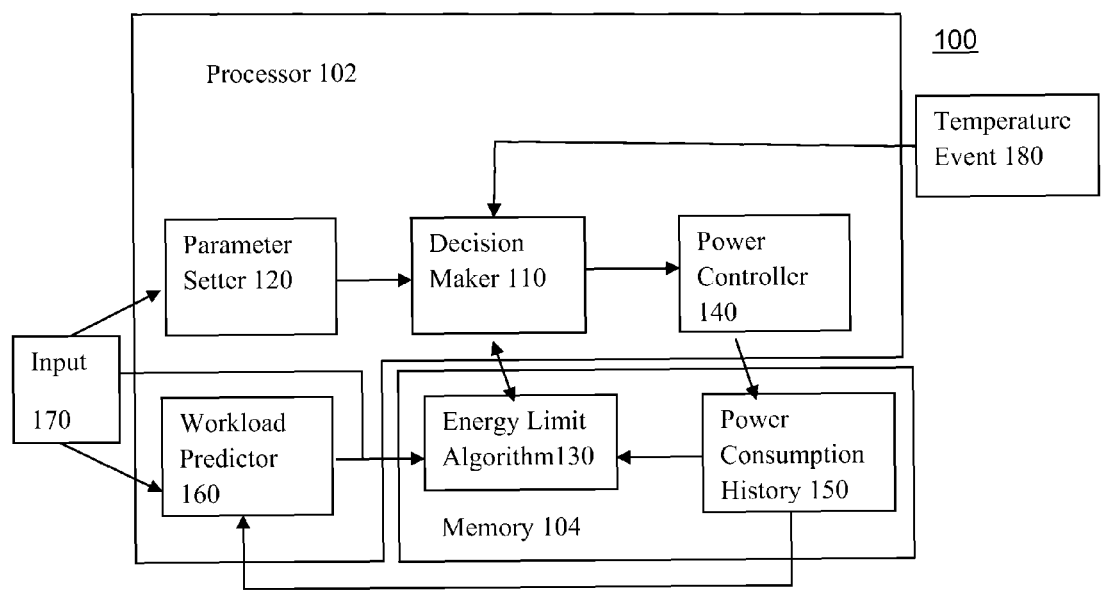
FIG. 1 is a high-level block diagram of a power and heat management system according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover modifications, equivalents and alternatives falling within the scope of the present invention.

DETAILED DESCRIPTION

We describe a method for specifying a temporal window of a certain size that slides along time, specifying energy consumption as the accumulated power consumption of computing systems in a temporal window, and applying a threshold that limits the energy consumption in a sliding window, while the power consumption is able to fluctuate within the window. Since the energy limit does not impose a limit on instantaneous power consumption, the system processing speed may on average be thereby improving the performance of workloads with bursty patterns of system processing demand.

Referring now to FIG. 1 we discuss a heat and power management system 100 according to an embodiment of the presented invention. Throughout the description herein, an embodiment of the invention is illustrated with aspects of the invention embodied solely on computer system 100. As will be appreciated by those of ordinary skill in the art, aspects of the invention may be distributed among one or more networked computing devices which interact with computer system 100 via one or more data networks. However, for ease of understanding, aspects of the invention have been embodied in a single computing device—computer system 100.

The system 100 includes inter alia a processor device 102 that in turn comprises a decision maker 110, a workload predictor 160, a power controller 140, and a parameter setter 120. The system also includes a memory device 104 that stores an energy limit algorithm 230 and a power consumption history 150.

The system 100 may receive a Temperature Event 180 such as an over-heating event or temperature measurement from some external temperature monitors. The over-heating event may trigger an emergency program, which may ask Power Controller 140 to shut down the Processor 102.

The system 100 also receives input from users. The input can be user-defined energy limit, which includes an energy limit value and a sliding window size, the information used by parameter setting 120 to derive the energy limit, the workload information used by workload predictor 160 to predict workload, and the workload performance requirements that may assist energy limit algorithm 130 to make power decisions.

The decision maker 110 accepts energy limit settings from parameter setter 120 and temperature event 180 from external sources. The decision maker 110 invokes energy limit algorithm 130 to get power management decisions that satisfy the energy limit and it invokes power controller 140 to adjust the power usage level based on the power management decisions. The power management decision may include the power usage level at present or in the future.

The parameter setter 120 uses input 170 to define the energy limit parameters, including an energy limit value and a sliding window size. If Input 170 already includes the energy limit parameters, the parameter setter 120 passes them to decision maker 110. In other cases, input 170 may include information of the hardware such as power function, which is the power consumption as a function of the operating frequency (speed), the information of the cooling system, and the temperature cap. Based on the information, parameter setter 120 can calculate the energy limit parameters that should avoid over-heating situation for the system.

The energy limit algorithm 130 requires as input an energy limit from the decision maker 110 and the power consumption of the last sliding window ended at the current time from the power consumption history 150. It may also use workload predictor 160 to gain knowledge of the workload and make better decisions for a specific workload. The energy limit algorithm 130 returns power management decisions that can achieve different optimization goals with energy limit as a constraint. In the embodiment in FIG. 4, an exemplary goal is to minimize the finish time of incoming workloads or tasks.

The power controller 140 uses power management technologies to control power usage; it also measures and saves the power usage level in power consumption history 150. Exemplary power management technologies include DVFS (dynamic voltage and frequency scaling) and clock throttling.

The workload predictor 160 predicts the demand for processing capacity of the incoming workload based on the workload information from input 170 and the workload history kept by it. An exemplary input information for a periodic real-time workload would include the period, the approximate execution time at a specific processing speed, and deadlines for completion. This workload information has well-defined processing requirements such that the workload predictor 160 can predict the demand of processing capacity for the specific workload in the future. An exemplary workload history may include the execution information for the last 10 runs of the specific workload such that the predictor can refine its estimate of the time that would be required to execute the workload at the present processing speed, or at a different processing speed.

Figure 2:
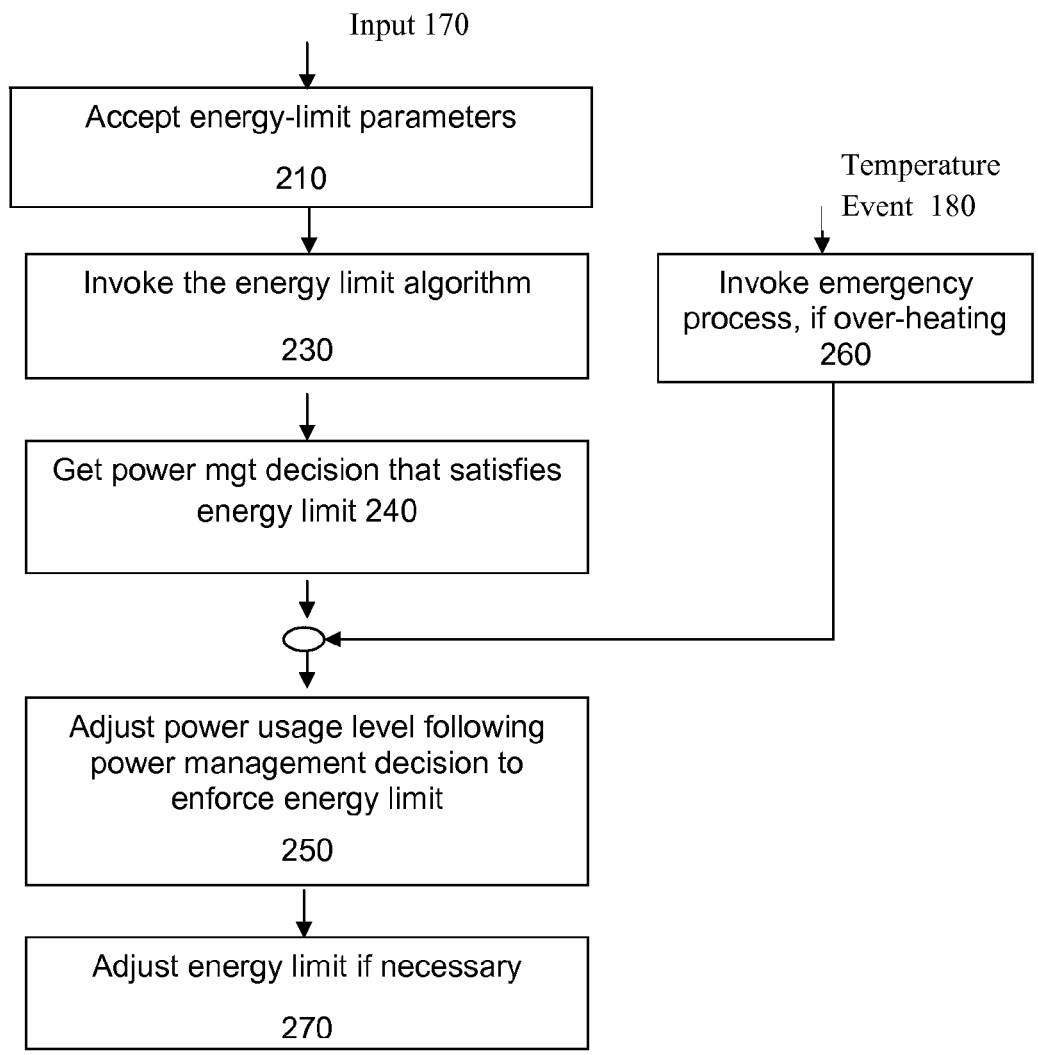
FIG. 2 is a flow chart illustrating a method used by the Decision Maker 110 in FIG. 1 according to another embodiment of the invention.

Referring to FIG. 2, there is shown a flowchart of a method that can be used by the decision maker 110 according to another embodiment of the invention. In step 210, the decision maker 110 accepts an energy limit from the parameter setter 120. System users can change the input 170 and thus influence the parameter setter 120 to change energy limit as desired The decision maker 110 also accepts temperature event 180. If the system 100 is over-heating, then in step 260 the decision maker 110 invokes an emergency process. An exemplary emergency process includes shutting down the processor immediately. Otherwise, in step 230 the decision maker 110 invokes the energy limit algorithm 130. In step 240 the decision maker 110 receives the power management decision that satisfies the given energy limit. Then, in step 250 the decision maker 110 invokes the power controller 140 to adjust the power usage level following the power management decision, if necessary, to enforce the energy limit. In step 270, the decision maker 110 can adjust energy limit if necessary. For example, if over-heating happens with the current energy limit, the decision maker 110 may adjust the energy limit to avoid over-heating in the future.

An embodiment of the present invention is directed toward a method to modulate power consumption of software executing on power-aware systems. The method includes steps of: specifying a temporal window of a fixed size that slides along time; specifying energy consumption as the accumulated power consumption in a temporal window; and applying a threshold that limits the energy consumption in a sliding window, while allowing the instantaneous power consumption to fluctuate within that sliding window. The step of applying a threshold that limits the energy consumption includes choosing a possibly time-dependent control (such as processor speed) such that the energy limit constraint will be satisfied, and enforcing the decision using appropriate power management technologies such as DVFS or clock throttling.

In the method, we set a limit for energy consumption during a sliding window of time. Given a window size w and a limit value $E_{th}$, we require that the energy consumption during any temporal window of size w is limited by the value $E_{th}$. That is, for any time s, we have $\int_s^{s+w} P(t)\,dt \leq E_{th}$, where P(t) is the power consumption at time t. For current computer chip technologies, the power consumption is a function of the frequency (speed). Let power function p(s) define the power consumption at a speed s, we have P(t)=p(s(t)).

Compared with known methods, a method according to an embodiment of the invention is capable of achieving a desired trade-off between power and performance. First, this method is proactive and is able to avoid over-heating situation that requires an immediate power cut, which results in a speed reduction. We can avoid a speed reduction when the processing demand is currently high but was low in previous temporal window. Second, the method as described herein has a better performance compared with the power limit method when the workload is bursty.

Figure 3:
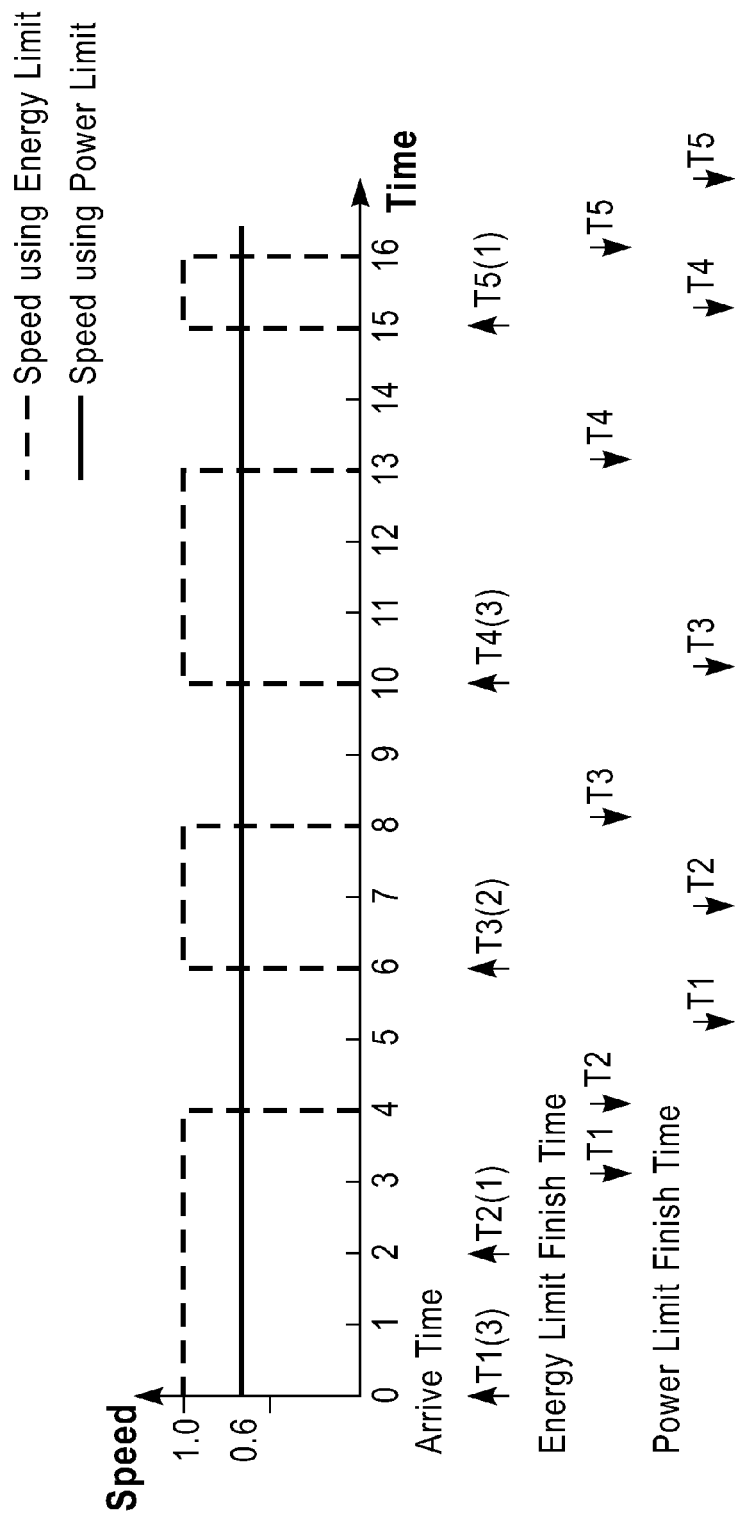
FIG. 3 shows an exemplary graph of processor speed versus time for various tasks assigned, according to an embodiment of the present invention.

Referring to FIG. 3, we show an example that demonstrates the performance gain of a method according to the invention compared with the power limit method. Five tasks (T1-T5) with different workloads, which are marked inside parentheses, arrive at different times. For example, task T1 arrives at time 0 and its workload is 3. We assume normalized speed whose maximum value is 1 and the power function is $p=s^2$, where s is processor speed. Power limit, in comparison, is set to 0.64, which corresponds to speed 0.8. The energy limit value is set to 6 and the size of the sliding window is 10 time units. Thus, the average power consumption in the sliding window is limited by 0.6, which is less than power limit 0.64. We demonstrate the finish time of tasks using power limit and energy limit methods.

From FIG. 3 one can see that using the energy limit produces a better performance than using a power limit because every task finishes earlier with the energy limit setting than with the power limit setting. For example, task T1 finishes at time 3 with an energy limit whereas it finishes at time 3.75 with a power limit.

The method provides a new constraint to use in power and heat management problem. Compared with the power limit method, the energy limit method is more flexible since it limits the sum of power consumption in a sliding temporal window instead of limiting the power consumption at any instant.

The energy limit can be used in workload scheduling, workload shaping and workload admission control. In workload scheduling, it can be used in both static and dynamic scheduling. Here, we give an example of a dynamic scheduling algorithm. We assume that no pre-knowledge of the workload, which is represented as multiple tasks, is known beforehand. However, when a new task arrives, its own workload is known.

At a scheduling point, we derive a future speed function that specifies the speed at which the processor will run as a function of time during a given time window. The speed function is designed to achieve other scheduling goals while satisfying the energy limit. The scheduling point can be a calling request from other programs, can be triggered by timer events, or can be a time point when the system workload is changed by task arrival or task termination.

As an example, we study a specific goal to maximizing performance while satisfying an energy limit. That is, the derived speed function is one that finishes the current system workload at the earliest time. In this deliberately simple example, we suppose that the processor can only run at two different speeds: $s_{max}$ and 0. Though we use this specific setting to demonstrate an application of the energy limit method, note that our method can be extended to other scheduling settings such as static scheduling, other optimal goals such as throughput, and other technologies such as DVFS.

To further simplify our discussion, we assume that the power consumption at speed 0 is 0. Let the energy limit be $E_{th}$ in a sliding window of size w. We can prove that the maximal workload that can be finished in a sliding window is $s_{max} t^*$, where $t^* = E_{th}/p(s_{max})$. Define the energy budget δ(t) at time t as the unused energy in the sliding window ending at time t. That is, $\delta(t) = E_{th} - \int_{(t-w)+\epsilon}^t P(s)\,ds$. We can use all the energy δ(t) between time t and time t+ε without violating the energy limit (ε is defined to be an infinitesimally small time interval).

Figure 4:
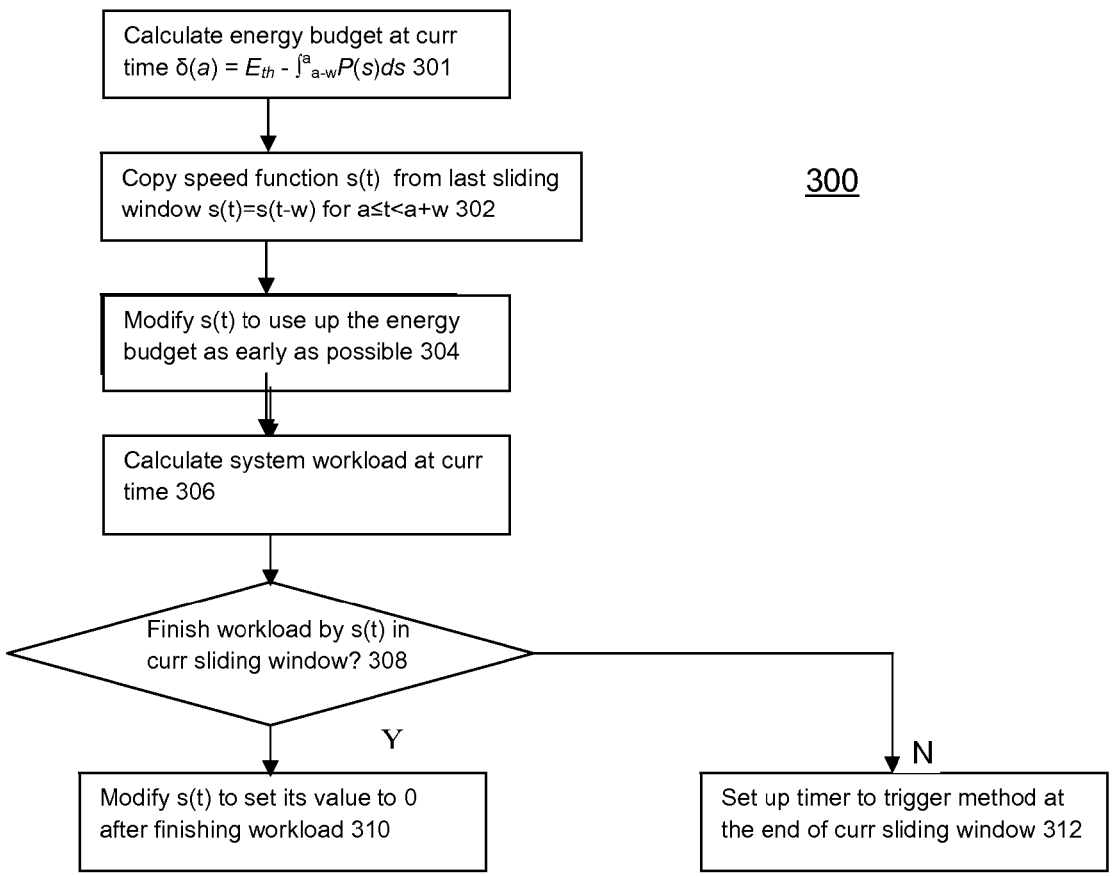
FIG. 4 shows a flowchart used by the Energy Limit Algorithm 130 in FIG. 1 of another embodiment according to the invention.

FIG. 4 shows a flowchart 300 of another embodiment according to the invention. The flowchart 300 shows at a time a, how to derive the optimal speed function for the current sliding window [a, a+w). The optimal speed function is the one that will finish the current workload as early as possible while satisfying the energy constraint. In step 301, we calculate energy budget δ(a) at time a given the history of power consumption of the last sliding window. In step 302, we copy the speed function from the last sliding window, i.e. we temporarily set s(t)=s(t-w) for a≦t<a+w. Inductively, we know this is a valid solution that does not violate the energy limit. In step 304, we use the energy budget δ(a) to improve the copied speed function s(t). First, we calculate how long the energy budget can support running at maximal speed $s_{max}$. The length of the period, which we define to be d, is $d=\delta(a)/p(s_{max})$. Then, starting from time a, we replace speed 0 in s(t) with speed $s_{max}$ until the sum of the replaced period reaches d. We can prove that the modified speed function does not violate the energy limit and can finish the workload as early as possible.

After the speed function is derived in step 304, we get the current system workload in step 306. If the system workload is known and can be finished at a time t before the end of the current sliding window, then we do not need to provide processing capacity after t and therefore we set the speed after t to 0 in step 310. Otherwise in step 312, we set a timer to invoke the method in FIG. 4 again at the end of the current sliding window. If any task arrives earlier than a+w, then the method is called and the timer is removed. If the system workload is empty, then we set the speed to 0.

Figure 5:
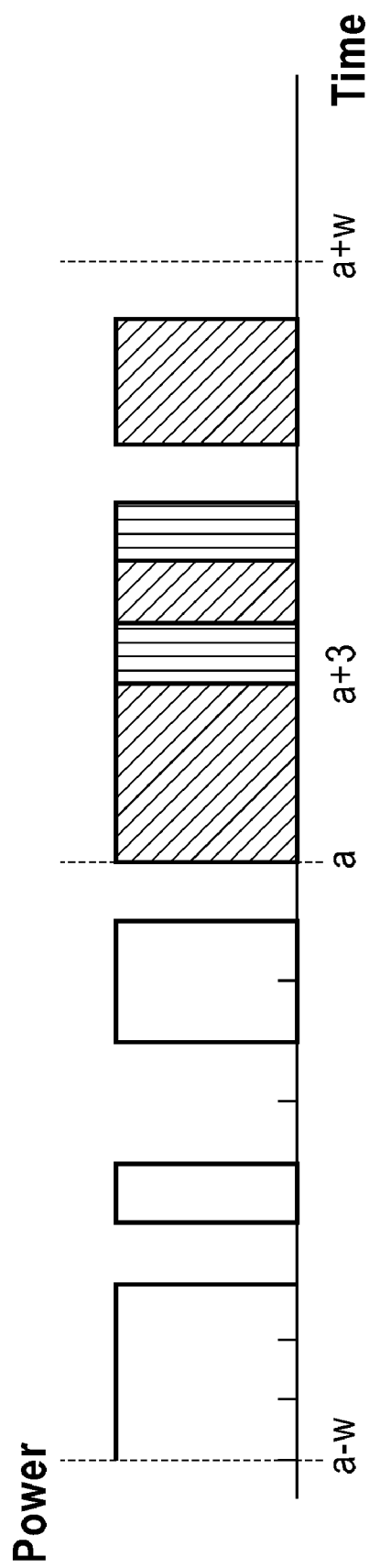
FIG. 5 shows an exemplary plot of sliding windows according to the embodiment of the present invention in FIG. 4.

We give an example in FIG. 5 to demonstrate the generated speed function. We assume that $E_{th}$ is $8p(s_{max})$ in a sliding window of size 10. That is, during any period of 10 time units, we can have speed $s_{max}$ for at most 8 time units. At time a, we have $\delta(a)=2p(s_{max})$, which can support 2 time units of running at $s_{max}$. We copy the speed function from last sliding window to the current sliding window [a, a+w). Then, we replace two units of speed 0 with speed $s_{max}$ during [a+3, a+4] and [a+5, a+6]. We can see from FIG. 5 that the resulting speed function does not violate the energy limit and uses up the energy budget as early as possible to finish workload as early as possible.

In the above description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

Therefore, while there has been described what is presently considered to be the preferred embodiment, it will be understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. An electronic system comprising:
    a memory device storing:
        an energy limit method that:
            receives as input an energy limit, comprising an energy limit value;
            receives as input a sliding window size for a sliding window, wherein said sliding window is defined as a fixed size temporal window that slides along time;
            receives as input a power consumption history of the electronic system of a previous sliding window ended at the current time; and
            returns power management decisions that have a plurality of optimization goals with the energy limit as a constraint; and
        the history of power consumption of the electronic system;
    a processor device, said processor device comprising:
        a parameter setter that receives inputs to define energy limit parameters;
        a decision maker that receives the energy limit parameters from the parameter setter and invokes an energy limit algorithm to determine energy consumption of the electronic system, wherein said energy consumption is an accumulated power consumption within the fixed size temporal windows; and
        a power controller that takes input from the decision maker and uses power management technologies to adjust the power usage of the electronic device by applying a threshold that limits a sum of the energy consumption within the sliding window instead of limiting the power consumption at any instant, thus allowing said power consumption to fluctuate within said sliding window, wherein said threshold is applied to a current sliding window as any unused energy in said current sliding window.

2. The electronic system of claim 1 wherein the memory device stores an energy limit based on both the sliding window size and energy limit value.

3. The electronic system of claim 1 wherein the parameter setter can use information of the electronic system, the cooling system and a temperature cap to calculate the energy limit that avoids over-heating.

4. The electronic system of claim 1 wherein the power controller controls power usage using clock throttling.

5. The electronic system of claim 1 wherein the power controller controls power usage using Dynamic Voltage and Frequency Scaling power management technology.

6. The electronic system of claim 1 further comprising a workload predictor.

7. The electronic system of claim 1 further comprising a temperature monitor coupled to the said electronic system for measuring a temperature value and determining whether the device is over-heating.

8. The electronic system of claim 7 wherein the decision maker receives an indication that the processor device is overheating from the temperature monitor.

9. The electronic system of claim 1 wherein the decision maker invokes the power controller to apply a threshold limit on the energy consumption in the sliding window while the power consumption fluctuates within the window.

10. A method to modulate power consumption of a power-aware system, the method comprising:
    receiving at a computer input device:
        energy limit parameters comprising an energy limit value;
        a sliding window size for a temporal window of a fixed size that slides along time; and
        a power consumption history of a previous sliding window ended at a current time, wherein energy consumption is defined as an accumulation of power consumption within the fixed size temporal windows;
    using an information processing device to perform:
        processing the power consumption history;
        deriving a processing speed for the current or future time by applying energy limit as a constraint, wherein said energy limit is applied as a threshold that limits a sum of the energy consumption within the temporal window instead of limiting power consumption at any instant, thus allowing said power consumption to fluctuate within said temporal window, wherein said threshold is applied to a current temporal window as any unused energy in said current temporal window.

11. The method of claim 10 wherein the method is used when a workload changes.

12. The method of claim 11 is used when the workload changes whereas the workload changes at a time comprising task arrival or termination.

13. The method of claim 10 wherein the method is used when the current energy limit is modified.

14. The method of claim 10 wherein the method is used as a response to timer events.

15. The method of claim 11 wherein the workload changes comprise a task arrival.

16. The method of claim 11 wherein the workload changes comprise a task termination.

* * * * *